(12) United States Patent
Chen et al.

(10) Patent No.: US 11,015,092 B2
(45) Date of Patent: May 25, 2021

(54) ADHESIVE FOR BINDING POLYOLEFIN MEMBRANE TO GLASS FIBERS

(71) Applicant: Dow Global Technologies LLC, Midland, MI (US)

(72) Inventors: Yongchun Chen, Shanghai (CN); Hang Wu, Shanghai (CN); Tao Han, Shanghai (CN); Haiyang Yu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 76 days.

(21) Appl. No.: 16/326,770

(22) PCT Filed: Aug. 23, 2016

(86) PCT No.: PCT/CN2016/096359
§ 371 (c)(1),
(2) Date: Feb. 20, 2019

(87) PCT Pub. No.: WO2018/035712
PCT Pub. Date: Mar. 1, 2018

(65) Prior Publication Data
US 2019/0203084 A1    Jul. 4, 2019

(51) Int. Cl.
| | |
|---|---|
| *C09J 151/00* | (2006.01) |
| *B32B 27/32* | (2006.01) |
| *C09J 151/06* | (2006.01) |
| *C08K 5/04* | (2006.01) |
| *B32B 25/10* | (2006.01) |
| *C08K 5/01* | (2006.01) |
| *C08K 5/00* | (2006.01) |
| *B32B 25/16* | (2006.01) |
| *B32B 5/02* | (2006.01) |
| *B32B 7/12* | (2006.01) |
| *B32B 27/12* | (2006.01) |

(52) U.S. Cl.
CPC ............ *C09J 151/003* (2013.01); *B32B 5/02* (2013.01); *B32B 7/12* (2013.01); *B32B 25/10* (2013.01); *B32B 25/16* (2013.01); *B32B 27/12* (2013.01); *B32B 27/32* (2013.01); *C08K 5/0025* (2013.01); *C08K 5/01* (2013.01); *C08K 5/04* (2013.01); *C09J 151/06* (2013.01); *B32B 2250/02* (2013.01); *B32B 2262/101* (2013.01); *B32B 2307/726* (2013.01); *B32B 2307/7265* (2013.01); *B32B 2307/748* (2013.01); *B32B 2405/00* (2013.01); *B32B 2419/06* (2013.01)

(58) Field of Classification Search
CPC ............... C09J 125/00; C09J 123/0838; C09J 151/003; C09J 151/06; C09J 153/00; C09J 11/06; C03C 25/00; Y10T 442/20
See application file for complete search history.

(56) References Cited

U.S. PATENT DOCUMENTS

| | | | | |
|---|---|---|---|---|
| 3,751,397 A | * | 8/1973 | Muto ..................... | C08L 51/06 523/213 |
| 4,789,699 A | | 12/1988 | Kieffer et al. | |
| 5,075,382 A | * | 12/1991 | Ohnnae ................. | C08F 255/02 428/429 |
| 5,093,422 A | | 3/1992 | Himes | |
| 5,332,613 A | | 7/1994 | Taylor et al. | |
| 5,580,679 A | * | 12/1996 | Tanaka .................... | H01M 2/08 429/171 |
| 6,582,829 B1 | | 6/2003 | Quinn et al. | |
| 6,984,699 B2 | | 1/2006 | Niino | |
| 2002/0037405 A1 | | 3/2002 | Naipawer, III et al. | |
| 2004/0087235 A1 | | 5/2004 | Morman et al. | |
| 2004/0122408 A1 | | 6/2004 | Potnis et al. | |
| 2004/0122409 A1 | | 6/2004 | Thomas et al. | |
| 2005/0106965 A1 | * | 5/2005 | Wevers ..................... | B32B 5/22 442/85 |
| 2006/0211819 A1 | | 9/2006 | Hoenig et al. | |
| 2008/0179574 A1 | * | 7/2008 | Yang ..................... | C08J 5/2231 252/601 |
| 2012/0070620 A1 | * | 3/2012 | Comert .................. | H02S 30/10 428/156 |
| 2014/0322474 A1 | * | 10/2014 | Usugi ................... | H01L 21/568 428/41.8 |
| 2015/0315400 A1 | * | 11/2015 | Yano ...................... | C09J 123/26 524/113 |
| 2017/0313916 A1 | * | 11/2017 | Tae ........................ | B32B 15/085 |
| 2018/0155534 A1 | * | 6/2018 | Kato ...................... | C08L 23/12 |

FOREIGN PATENT DOCUMENTS

| | | | |
|---|---|---|---|
| CN | 102677785 A | | 9/2012 |
| EP | 0712892 B1 | | 3/2002 |
| EP | 2363441 A1 | | 9/2011 |
| JP | 2000303047 | * | 10/2000 |
| JP | 2008282708 A | | 11/2008 |
| JP | 2010040449 A | | 2/2010 |
| JP | 2011213767 A | | 10/2011 |
| WO | 2004/041538 A1 | | 5/2004 |
| WO | 2014/204845 A1 | | 12/2014 |
| WO | 2015/188763 A1 | | 12/2015 |

* cited by examiner

*Primary Examiner* — Jennifer A Steele
(74) *Attorney, Agent, or Firm* — Quarles & Brady LLP

(57) ABSTRACT

A composition comprising, in weight percent (wt %) based on the weight of the composition: (A) greater than zero to 39 wt % of at least one of a polar olefin polymer and a styrenic block copolymer; (B) greater than zero to 20 wt % of an epoxy or amine-functionalized silane; (C) 60 to 99 wt % of an organic solvent for a mixture of (1) the polar olefin polymer and/or styrenic block copolymer, and (2) the epoxy or amine-functionalized silane; and (D) zero to 10 wt % of a polyisocyanate crosslinking agent.

17 Claims, No Drawings

ADHESIVE FOR BINDING POLYOLEFIN MEMBRANE TO GLASS FIBERS

FIELD OF THE INVENTION

This invention relates to adhesives. In one aspect the invention relates to an adhesive for binding a nonpolar coating to a polar substrate while in another aspect, the invention relates to waterproof roofing membranes, textile architecture membranes and their manufacture.

BACKGROUND OF THE INVENTION

Coated fabrics have been widely used in waterproof roofing membrane and textile architecture membranes. Coated fabrics present a symmetrical structure of yarns arranged in two main orthogonal directions: warp and fill. The yarns consist of threads parallel or twisted together and can be made of several materials. While the structural function is mainly provided by the yarns, the protection from chemical and biological influences, fire-retardant behavior, weld ability, waterproof qualities and UV ray resistance depend on the coating layer.

Glass fibers are generally used for permanent heavy duty applications due to their high modulus of elasticity and the tensile strength, and because they have an intrinsically high resistance to fire and UV degradation. Polyvinyl chloride (PVC), polytetrafluoroethylene (PTFE), ethyltetrafluoroethylene (ETFE), polyurethane (PU), silicon and polyolefin are the major polymers used as coating material for coated fabrics. For outdoor coated fabrics, major fabrics are polyester (PES), polyethylene (PE) and fiberglass. For indoor and temporary applications, fibers like elastane (e.g., SPANDEX™, LYCRA™) and nylon are used.

Polyolefin elastomers (POE), such as INFUSE™ olefin block copolymers, VERSIFY™ propylene-based elastomers and ENGAGE™ ethylene-based polymers, exhibit many desirable properties that include, but are not limited to, excellent weathering and water resistance, light weight, easy processing, recyclability and cost performance balance, that make them an excellent choice for the coating layer of waterproof roofing membranes and textile architecture membranes. However, due to their nonpolar nature, POE are difficult to bond to polar substrates, e.g., glass fibers, and advances on this problem remain of interest to the industry.

SUMMARY OF THE INVENTION

In one embodiment the invention is a composition comprising, in weight percent (wt %) based on the weight of the composition:
(A) greater than zero to 39 wt % of at least one of a polar olefin polymer and a styrenic block copolymer;
(B) greater than zero to 20 wt % of an epoxy or amine-functionalized silane;
(C) 60 to 99 wt % of an organic solvent for a mixture of (1) the polar olefin polymer and/or styrenic block copolymer, and (2) the epoxy or amine-functionalized silane; and
(D) zero to 10 wt % of a polyisocyanate crosslinking agent.

In one embodiment the invention is a multilayer structure comprising:
(1) A fabric layer comprising a polar yarn;
(2) A membrane layer comprising a nonpolar olefin polymer; and
(3) An adhesive layer between and in contact with both the fabric layer and the membrane layer, the adhesive layer made from a composition comprising, in weight percent (wt %) based on the weight of the composition:
(A) greater than zero to 39 wt % of at least one of a polar olefin polymer and a styrenic block copolymer;
(B) greater than zero to 20 wt % of an epoxy or amine-functionalized silane;
(C) 60 to 99 wt % of an organic solvent for a mixture of (1) the polar olefin polymer and/or styrenic block copolymer, and (2) the epoxy or amine-functionalized silane; and
(D) zero to 10 wt % of a polyisocyanate crosslinking agent.

DETAILED DESCRIPTION OF THE PREFERRED EMBODIMENT

Definitions

Unless stated to the contrary, implicit from the context, or customary in the art, all parts and percentages are based on weight and all test methods are current as of the filing date of this disclosure. For purposes of United States patent practice, the contents of any referenced patent, patent application or publication are incorporated by reference in their entirety (or its equivalent US version is so incorporated by reference), especially with respect to the disclosure of definitions (to the extent not inconsistent with any definitions specifically provided in this disclosure) and general knowledge in the art.

The numerical ranges disclosed herein include all values from, and including, the lower and upper value. For ranged containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

An "olefin" is an unsaturated, aliphatic or alicyclic, substituted or unsubstituted hydrocarbon having one or more double bonds.

"Olefin-based polymer", "olefin polymer" and like terms mean a polymer containing, in polymerized form, a majority weight percent of an olefin, for example ethylene or propylene, based on the total weight of the polymer. Non-limiting examples of olefin-based polymers include ethylene-based polymers and propylene-based polymers.

"Ethylene-based polymer", "ethylene polymer" and like terms mean a polymer that comprises a majority amount of polymerized ethylene based on the weight of the polymer and, optionally, may comprise at least one comonomer.

"Propylene-based polymer", "propylene polymer" and like terms mean a polymer that contains more than 50 mole percent polymerized propylene monomer (based on the total amount of polymerizable monomers) and, optionally, may contain at least one comonomer.

"Polar," "polar polymer" and like terms refer to polymer molecules with a permanent dipole, i.e., the polymer molecule has a positive end and a negative end. In other words, the electrons in a polar molecule are not shared equally among the atoms of the molecule. In contrast, "nonpolar," "nonpolar polymer" and like terms refer to polymer molecules that do not have a permanent dipole, i.e., the polymer does not have a positive end and a negative end. The electrons in a nonpolar molecule are essentially equally shared among the atoms of the molecule. Most hydrocarbon liquids and polymers are nonpolar.

A "polar group" is any group that imparts a bond dipole moment to an otherwise essentially nonpolar olefin molecule. Exemplary polar groups include carbonyls, carboxylic acid groups, carboxylic acid anhydrate groups, carboxylic ester groups, epoxy groups, sulfonyl groups, nitrile groups, amide groups, silane groups and the like, and these groups can be introduced into the olefin-based polymer either through grafting or copolymerization.

Component (A) of the Composition

Polar Olefin Polymer

The polar olefin polymers used in the practice of this invention are olefin polymers comprising one or more polar groups. Exemplary polar groups include carbonyls, carboxylic acid groups, carboxylic acid anhydride groups, carboxylic ester groups, vinyl ester groups, epoxy groups, sulfonyl groups, nitrile groups, amide groups, silane groups and the like, and these groups can be introduced into the olefin polymer either through grafting or copolymerization. Exemplary polar olefin polymers include ethylene/acrylic acid (EAA), ethylene/methacrylic acid (EMA), ethylene/acrylate or methacrylate, ethylene/vinyl acetate (EVA), poly(ethylene-co-vinyltrimethoxysilane) copolymer, and maleic anhydride-(MAH) or silane-grafted olefin polymers. Preferred polar olefin polymers include DuPont ELVAX™ ethylene vinyl acetate (EVA) resins, AMPLIFY™ EA ethylene ethyl acrylate (EEA) copolymer from The Dow Chemical Company, PRIMACOR™ ethylene/acrylic acid copolymers from The Dow Chemical Company, and SI-LINK™ poly(ethylene-co-vinyltrimethoxysilane) copolymer from The Dow Chemical Company. In one embodiment the polar olefin polymer is EEA. The polar olefin polymers can be produced in a conventional high pressure process by copolymerizing ethylene with a polar comonomer, e.g., vinyl acetate, ethyl acrylate, etc., using a free radical initiator such as an organic peroxide under reaction temperatures in the range of 150 to 350° C. and reaction pressure of 100 to 300 MPa.

In one embodiment of this invention, the polar olefin polymer is grafted with a polar group. The polar group grafted polymer can contain 0.05 to 5 or 10 parts by weight of grafted polar group per 100 parts by weight of polymer and preferably contains 0.1 to 2 parts by weight of grafted polar group per 100 parts by weight of polymer. POE grafted with maleic anhydride is a preferred polar group grafted polar olefin polymer, e.g., AMPLIFY™ GR 216 available from The Dow Chemical Company.

In one embodiment the polar olefin polymer is not neutralized. In one embodiment the polar olefin polymer does not contain a nitrogen-containing group, e.g., an amine. In one embodiment the polar olefin polymer is not blended or otherwise mixed with a compound that can neutralize its polar group, e.g., with an amine-containing compound such as ethylenediamine or morpholine.

In one embodiment the polar olefin polymer, particularly an EEA polymer has a melt flow rate in the range of 0.5 to 50 grams per 10 minutes (g/10 min). The polar comonomer content is typically from 5 to 40 weight percent, more typically from 10 to 35 weight percent based on the weight of the polymer.

Styrenic Block Copolymer

The styrenic block copolymers used in the practice of this invention, before grafting with a polar group, include at least two monoalkenyl arene blocks, preferably two polystyrene blocks, separated by a block of saturated conjugated diene, preferably a saturated polybutadiene block. The preferred styrenic block copolymers have a linear structure, although in some embodiments, branched or radial polymers or functionalized block copolymers make useful compounds. The total number average molecular weight of the styrenic block copolymer is preferably from 30,000 to 250,000 if the copolymer has a linear structure. Such block copolymers typically have an average polystyrene content from 6 to 65, more typically from 10 to 40 wt % of the copolymer. Examples of styrenic block copolymers suitable for use in this invention are described in EP 0 712 892; WO 2004/041538; U.S. Pat. Nos. 6,582,829; 4,789,699; 5,093,422 and 5,332,613; and US 2004/0087235, 2004/0122408, 2004/0122409, and 2006/0211819. Nonlimiting examples of suitable styrenic block copolymers include styrene/butadiene (SB) copolymers, styrene/ethylene/butylene/styrene (SEBS) terpolymers, styrene/butadiene/styrene (SBS) terpolymers, hydrogenated or partially hydrogenated SBS, styrene/isoprene (SI), and styrene/ethylene/propylene/styrene (SEPS) terpolymers. Commercial sources of styrenic block copolymers include Kraton Polymers (SEBS G1643M, G1651ES), Asahi Kasei Chemicals Corporation, and Kuraray America.

In one embodiment of this invention, the styrenic block copolymer is grafted with a polar group. The polar group grafted styrenic block copolymer can contain 0.05 to 5 or 10 parts by weight of grafted polar group per 100 parts by weight of polymer and preferably contains 0.1 to 2 parts by weight of grafted polar group per 100 parts by weight of polymer. SEBS grafted with maleic anhydride is a preferred polar group grafted styrenic block copolymer, e.g., KRATON™ FG 1901 available from Kraton Polymers.

Polar Group Graft

The amount of polar group containing-compound, e.g., maleic anhydride, to be added to modify the polar olefin polymer or styrenic block polymer is typically in the range of 0.05 to 10 weight percent based on the weight of the polymer. Grafting can be accomplished by, for example, solution, suspension, or melting methods. The solution method is effected by mixing the polar group containing compound, the polymer to be grafted, a non-polar organic solvent and a free radical initiator such as an organic peroxide, and then heating the mixture to 100 to 160° C. to perform the modification reaction. Hexane, heptane, benzene, toluene, xylene, chlorobenzene and tetra-chloroethane are examples of non-polar solvents. 2,5-dimethyl-2,5-di(t-butyl peroxy) hexane, 2,5-dimethyl-2,5-di(t-butyl peroxy) hexyne-3, and benzoyl peroxide are examples of organic peroxides. In the suspension method, the polymer to be grafted and the polar group containing compound are mixed with a polar solvent such as water and then a free radical initiator is added. The mixture is then heated to a temperature above 100° C. to obtain a grafted polymer. In the melting method, the polymer to be grafted, the polar group containing compound, and a free radical initiator are introduced into a melting-kneading machine such as an extruder or a BANBURY™ mixer to obtain the grafted polymer.

Typical anhydride modifications can be described as follows: Grafting is accomplished by adding a solution of anhydride, an organic peroxide catalyst, and an organic solvent to the polymer-to-be-grafted in particulate form. The organic peroxide initiator is soluble in the organic solvent. Various organic solvents, which are inert to the reaction, can be used. Examples of useful organic solvents are acetone, methyl ethyl ketone, methyl propyl ketone, 3-pentanone, and other ketones. Other carrier solvents which allow solubilization of peroxide and anhydride, and which strip off well under appropriate devolatilization conditions may be used. Acetone is a preferred solvent because it acts as a stripping agent for residuals such as non-grafted anhydride or anhydride by-products. The anhydride solution can contain 10 to 50 percent by weight anhydride; 0.05 to 5 percent by weight organic peroxide; and 50 to 90 percent by weight organic solvent based on the total weight of the solution. A preferred solution contains 20 to 40 percent anhydride; 0.1 to 2 percent peroxide; and 60 to 80 percent solvent.

Amount of Component (A) in the Composition

Component (A), i.e., one or both of the polar olefin polymer and the styrenic block copolymer, typically comprises greater than (>) zero, or greater than or equal to (≥) 1, or ≥2, wt % based on the weight of the composition. Component (A) typically comprises less than or equal to (≤) 39, or ≤29, or ≤19 wt % based on the weight of the composition.

Component (B), Silane

Any silane that will promote the adhesive properties of the composition can be used in the practice of this invention. Typically and preferably silanes are epoxy-functionalized silanes or amine-functionalized silanes. Epoxy-functionalized silanes include but are not limited to SILQUEST™ A-187 (gamma-glycidoxypropyltrimethoxysilane), SILQUEST™ A-1871 (gamma-glycidoxypropyltriethoxysilane), SILQUEST™ A-186 (Beta-(3,4-epoxycyclohexyl)-ethyltrimethoxysilane), and COATOSIL™ 2287 (diethoxy (3-glycidyloxypropyl)methylsilane). Amine-functionalized silanes include but are not limited to SILQUEST™ A-1100 (gamma-aminopropyltriethoxysilane), SILQUEST™ A-1120 (N(beta-aminoethyl) gamma-aminopropyl-trimethoxysilane), SILQUEST™ A-2120 (N(beta-aminoethyl) gamma-aminopropylmethyl-dimethoxysilane). SILQUEST™ A-1170, SILQUEST™ Y-9627 and SILQUEST™ Y-11699 are secondary amino-functional bis-silanes which can also be used in current adhesives.

The silane typically comprises greater than (>) zero, or greater than or equal to (≥) 0.1, or ≥0.5, wt % based on the weight of the composition. The silane typically comprises less than or equal to (≤) 20, or ≤10, or ≤5, wt % based on the weight of the composition.

Component (C), Solvent

Any solvent that will solubilize a mixture of the (A) polar olefin polymer and/or styrenic block copolymer, (B) silane, and (D) crosslinking agent can be used in the practice of this invention. Typically and preferably the solvent is a blend of at least one hydrocarbon and at least one polar functionalized hydrocarbon. The solvent is liquid under ambient conditions, e.g., 23° C. and atmospheric pressure. Representative hydrocarbons include both aliphatic and aromatic such as hexane, cyclohexane, methylcyclohexane, heptane, naphtha, decalin, benzene, toluene, xylene, naphthalene, etc., and representative polar functionalized hydrocarbons include carbon tetrachloride, perchloroethylene, cyclohexanone, chlorobenzene and tetra-chloroethane. Mixtures comprising methylcyclohexane (MCH) and cyclohexanone (CYC) are preferred, and these mixtures can vary in weight ratio from 5:95 to 95:5 MCH:CYC, or from 1:99 to 99:1 MCH:CYC, or from 4:96 to 96:4 MCH:CYC.

The solvent typically comprises greater than or equal to (≥) 60, or ≥70, or ≥80, wt % based on the weight of the composition. The solvent typically comprises less than or equal to (≤) 99, or ≤98, or ≤96, wt % based on the weight of the composition.

Component (D), Crosslinking Agent

In one embodiment of the invention, the composition comprises a crosslinking agent. Any crosslinking agent that is compatible with the other components of the composition and that will effect and/or promote crosslinking of the one or more of the polymeric compounds of the composition can be used. One preferred crosslinking agent is DESMODUR™ RFE, a solution of tris(p-isocyanatophenyl) thiophosphate in ethyl acetate and available from Covestro. Other crosslinking agents include, but are not limited to, hexamethylene diisocyanate (HDI) based isocyanate crosslinkers such as DESMODUR™ N-3300, DESMODUR™ N-3900 and DESMODUR™ N-3600; isophorone diisocyanate (IPDI) based crosslinkers such as DESMODUR™ Z-4470 and DESMODUR™ XP-2565; and methylene diphenyldiisocyanate (MDI) or toluene diisocyanate (TDI) based isocyanates such as SPECFLEX™ NS-540, SPECFLEX™ NE-112, SPECFLEX™ NF-248, ISONATE™ M 150, VORNANTE™ T80-20.

If present in the composition, then the crosslinking agent typically comprises greater than (>) zero, or greater than or equal to (≥) 0.1, wt % based on the weight of the composition. The crosslinking agent typically comprises less than or equal to (≤) 10, or ≤5, wt % based on the weight of the composition.

Compounding the Composition

The adhesive composition of this invention is prepared using known techniques and known equipment. The order in which the various components of the composition can be mixed with one another to form the composition is not critical to the invention and can thus vary to convenience. In one embodiment, the polar olefin polymer and the styrenic block copolymer are each mixed separately with the solvent, the two mixtures are then mixed with one another, and then the silane is mixed with the mixture of polar olefin polymer, styrenic block copolymer and solvent. In one embodiment, the silane is first mixed with the solvent, and then blended separately with one or both of the polar olefin copolymer and styrenic block copolymer. The mixture of polar olefin polymer, styrenic block copolymer, silane and solvent is stirred or otherwise agitated until a homogeneous mixture is obtained. The crosslinker, if present, is typically added to the homogeneous mixture at the time the mixture is ready for use.

Roofing and Architectural Membranes

The compositions of this invention are used in the same manner as known adhesives for the manufacture of roofing, architectural and other such membranes. Either or both of the polar fabric, e.g., fiber glass mats, and the nonpolar membranes, e.g., polyolefin membranes, are coated with the inventive composition by any technique, e.g., spraying, brushing, roll coating, etc., and then joined to the other, typically under heat and pressure.

The following examples illustrate certain embodiments of the invention.

Specific Embodiments

Materials

The glass fiber substrate comprised untreated (confirmed by FTIR analysis) glass fibers.

The polyolefin elastomer (POE) waterproof roofing membrane comprises:
  (A) 70 parts per hundred resin (phr) VERSIFY™ 2300 (a propylene-ethylene copolymer with a density of 0.866 g/cc and an MFR of 2 g/10 min (230° C./2.16 Kg) available from The Dow Chemical Company);
  (B) 8 phr ENGAGE™ 7387 HM (an ethylene-butene copolymer with a density of 0.872 g/cc and a MI (12) of 0.5 g/10 min (190° C./2.16 Kg) available from The Dow Chemical Company);
  (C) 22 phr S-T B1530 (a block copolymer polypropylene resin with a density of 0.91 g/cc and MFR of 10 g/10 min (230° C./2.16 Kg) available from Samsung-Total Petrochemicals Co., Ltd.);
  (D) 55 phr ATIMAG™ 16 ZA calcium carbonate available from Atimag;

(E) 6 phr TI-PURE™ 105 (a rutile titanium dioxide pigment manufactured by the chloride process) available from DuPont;

(F) 0.35 phr IRGANOX™ B225 (a blend of 50% tris(2,4-ditert-butylphenyl)phosphite and 50% pentaerythritol tetrakis[3-[3,5-di-tert-butyl-4-hydroxyphenyl]propionate]available from BASF; and (G) 0.75 phr CHIMASSORB™ 2020 (a high-molecular-weight, hindered amine light stabilizer (HALS)) available from BASF.

AMPLIFY™ GR 216 is a MAH-g-POE (MAH-g-polyolefin elastomer (POE) copolymer containing 0.5-1 wt % MAH) and is available from The Dow Chemical Company.

KRATON™ FG 1901 is a MAH-g-SEBS (1.7 wt % MAH, 30 wt % styrene) and is available from Kraton Polymers.

SILQUEST™ A-187 silane is γ-glycidoxypropyltrimethoxysilane and is available from Momentive.

The solvent is a blend of methylcyclohexane (MCH) and cyclohexanone (CYC) at a weight ratio of 95:5.

DESMODUR™ RFE is a crosslinker comprising a solution of tris(p-isocyanatophenyl) thiophosphate in ethyl acetate and is available from Covestro.

Adhesive Preparation

Ten (10) percent by weight (wt %) of AMPLIFY™ GR 216 MAH-g-POE is dissolved in a 85.5/4.5 by weight solvent blend of methylcyclohexane and cyclohexanone. Ten (10) wt % of KRATON™ FG 1901 MAH-g-SEBS is dissolved in methylcyclohexane. 0.99 wt % of SILQUEST™ A-187 silane is introduced into either the solution of AMPLIFY™ GR 216 MAH-g-POE or the solution of KRATON™ FG 1901 MAH-g-SEBS and once thoroughly mixed, the other solution, i.e., the solution without the SILQUEST™ A-187 silane, is added and the resulting mixture is then stirred at room temperature (23° C.) at 500-2000 revolutions per minute (rpm) until a homogeneous blend is obtained (usually after 15 minutes of stirring). The adhesive is then transferred to a glass bottle, sealed and stored under ambient conditions (e.g., 23° C. and atmospheric pressure) until needed.

Lamination

A glass fabric is coated with the adhesive, and then placed in an oven for 3 minutes at 120° C. to remove the organic solvents. The coated fabric is laminated together with the POE compound sheet using a compression molder at 170° C. for 6 seconds with a compression force of 4 kiloNewtons (kN).

Peel Strength Test

The peel strength test is performed in accordance with ASTM D1876 (Peel Resistance for Adhesives, T-Peel Test). The laminated fabric and POE sheet samples are cut into 3 cm×15 cm rectangular specimens, the peel strength is measured on an INSTRON™ machine using a 180 degree peel test with a crosshead speed of 300 mm/min. The average load (measured in kilogram-force, or kgf) is recorded and the average peel strength (kgf/3 cm) is calculated from at least 3 samples.

RESULTS AND DISCUSSION

Four comparative examples and six inventive examples are prepared and their compositions and average peel strength data are reported in Table 1 below. Comparative Example 1 (CE-1) is a blank sample (i.e., no adhesive is coated on the glass fabric, and the glass fabric is laminated with polyolefin film directly). The standard deviations of all the peel strength data are below 0.15 kgf/3 cm.

TABLE 1

Composition and Average Peel Strength of Inventive and Comparative Examples

| Materials | CE-1 | CE-2 | CE-3 | CE-4 | IE-1 | IE-2 | IE-3 | IE-4 | IE-5 | IE-6 | IE-7 | IE-8 | IE-9 |
|---|---|---|---|---|---|---|---|---|---|---|---|---|---|
| Formulation (wt %) | | | | | | | | | | | | | |
| GR 216 | 0.00 | 10.00 | 0.00 | 8.00 | 9.90 | 0.00 | 7.92 | 9.72 | 0.00 | 7.78 | 9.90 | 9.72 | 7.78 |
| FG 1901 | 0.00 | 0.00 | 10.00 | 2.00 | 0.00 | 9.90 | 1.98 | 0.00 | 9.72 | 1.94 | 0.00 | 0.00 | 1.94 |
| Silane (A 187) | 0.00 | 0.00 | 0.00 | 0.00 | 0.99 | 0.99 | 0.99 | 0.97 | 0.97 | 0.97 | 0.00 | 0.00 | 0.00 |
| Silane (A 1100) | 0.00 | 0.00 | 0.00 | 0.00 | 0.00 | 0.00 | 0.00 | 0.00 | 0.00 | 0.00 | 0.99 | 0.97 | 0.97 |
| RFE | 0.00 | 0.00 | 0.00 | 0.00 | 0.00 | 0.00 | 0.00 | 1.80 | 1.80 | 1.80 | 0.00 | 1.80 | 1.80 |
| MCH | 0.00 | 85.50 | 90.00 | 85.50 | 84.65 | 89.11 | 84.65 | 83.13 | 87.51 | 83.13 | 84.65 | 83.13 | 83.13 |
| CYC | 0.00 | 4.50 | 0.00 | 4.50 | 4.46 | 0.00 | 4.46 | 4.38 | 0.00 | 4.38 | 4.46 | 4.38 | 4.38 |
| Total (wt %) | 0.00 | 100.00 | 100.00 | 100.00 | 100.00 | 100.00 | 100.00 | 100.00 | 100.00 | 100.00 | 100.00 | 100.00 | 100.00 |
| Average Peel Strength (Kgf/3 cm) | | | | | | | | | | | | | |
| | 0.3 | 4.2 | 2.6 | 4.1 | 7.0 | 4.0 | 5.8 | 11.5 | 10.8 | 10.8 | 7.5 | 9.3 | 9.1 |

Blank sample CE-1 has a low peel strength (0.3 kgf/3 cm) which is because the peel strength is only contributed by mechanical interlocking effect in a coated glass fiber scrim substrate. It indicates merely mechanical interlocking force itself could not provide sufficient adhesion between a glass fiber substrate and a POE compound film.

Laminated glass fiber fabric with either the MAH-g-POE or MAH-g-SEBS adhesive shows improved adhesion above the blank sample. The peel strength of MAH-g-SEBS based adhesive can reach to 2 kgf/3 cm and the MAH-g-POE based adhesive could even reach to 4 kgf/3 cm.

With the introduction of the silane SILQUEST™ A 187 into formulations, the peel strength of IE-1 (7 kgf/3 cm) is higher than that of its corresponding comparative example CE-2 (4.2 kgf/3 cm) which does not comprise silane. The peel strength of IE-2 (4 kgf/3 cm) is higher than that of its corresponding comparative example CE-3 (2.6 kgf/3 cm), which means the introduction of the silane can further improve the peel strength of MAH-g-SEBS or MAH-g-POE based adhesives, and the peel strength of the two adhesives blends also have an obvious improvement after the introduction of the silane, which is from 4.1 to 5.8 kgf/3 cm.

With the introduction of the silane SILQUEST™ A 1100 into formulations, the peel strength of IE-7 (7.5 kgf/3 cm) is higher than that of its corresponding comparative example CE-2 (4.2 kgf/3 cm) which does not comprise silane.

If more aggressive bonding force is required, the crosslinker can be introduced into the above samples to make 2 k adhesives. The introduction of crosslinker into those silane-containing adhesives can further improve peel strength, and the peel strength of all adhesives are able to increase to about 9 to 11 kgf/3 cm.

The invention claimed is:

1. A composition comprising, in weight percent (wt %) based on the weight of the composition:
   (A) from greater than or equal to 2 wt % to 19 wt % of at least one of a maleic anhydride-grafted ethylene-based polymer and a maleic anhydride-grafted styrene/ethylene/butylene/styrene (SEBS) block copolymer;
   (B) from greater than or equal to 0.1 wt % to 5 wt % of a silane selected from the group consisting of an epoxy-functionalized silane, an amine-functionalized silane, and combinations thereof;
   (C) from 80 wt % to 99 wt % of an organic solvent for a mixture of (1) the polar olefin polymer and/or styrenic block copolymer, and (2) the epoxy or amine-functionalized silane; and
   (D) zero to 10 wt % of a polyisocyanate crosslinking agent.

2. The composition of claim 1 in which the organic solvent is a mixture of methylcyclohexane and cyclohexanone.

3. The composition of claim 1 in which the polyisocyanate crosslinking agent is present and comprises at least one of (i) a solution of tris(p-isocyanatophenyl) thiophosphate in ethyl acetate, (ii) a hexamethylene diisocyanate (HDI) based isocyanate, (iii) an isophorone diisocyanate (IPDI), and (iv) a methylene diphenyldiisocyanate (MDI) or toluene diisocyanate (TDI) based isocyanate.

4. The composition of claim 3 comprising from greater than or equal to 0.1 wt % to less than or equal to 10 wt % of the polyisocyanate crosslinking agent.

5. The composition of claim 1 comprising
   (A) from greater than or equal to 2 wt % to 19 wt % of the maleic anhydride-grafted ethylene-based polymer;
   (B) from greater than or equal to 0.1 wt % to 5 wt % of the epoxy-functionalized silane, and
   (C) from 80 wt % to 99 wt % of an organic solvent that is a mixture of methylcyclohexane and cyclohexanone.

6. The composition of claim 1 comprising
   (A) from greater than or equal to 2 wt % to 19 wt % of the maleic anhydride-grafted styrene/ethylene/butylene/styrene (SEBS);
   (B) from greater than or equal to 0.1 wt % to 5 wt % of the epoxy-functionalized silane, and
   (C) from 80 wt % to 99 wt % of an organic solvent that is methylcyclohexane.

7. The composition of claim 1 comprising:
   (A) from greater than or equal to 2 wt % to 19 wt % of a blend of the maleic anhydride-grafted ethylene-based polymer and the maleic anhydride-grafted styrene/ethylene/butylene/styrene (SEBS) block copolymer;
   (B) from greater than or equal to 0.1 wt % to 5 wt % of the epoxy-functionalized silane, and
   (C) from 80 wt % to 99 wt % of an organic solvent that is a mixture of methylcyclohexane and cyclohexanone.

8. The composition of claim 1 comprising:
   (A) from greater than or equal to 2 wt % to 19 wt % of the maleic anhydride-grafted ethylene-based polymer;
   (B) from greater than or equal to 0.1 wt % to 5 wt % of the epoxy-functionalized silane;
   (C) from 80 wt % to 99 wt % of an organic solvent that is a mixture of methylcyclohexane and cyclohexanone; and
   (D) from greater than 0.1 wt % to less than 5 wt % of the polyisocyanate crosslinking agent.

9. The composition of claim 1 comprising:
   (A) from greater than or equal to 2 wt % to 19 wt % of the maleic anhydride-grafted styrene/ethylene/butylene/styrene (SEBS) block copolymer;
   (B) from greater than or equal to 0.1 wt % to 5 wt % of the epoxy-functionalized silane;
   (C) from 80 wt % to 99 wt % of an organic solvent that is methylcyclohexane; and
   (D) from greater than 0.1 wt % to less than 5 wt % of the polyisocyanate crosslinking agent.

10. The composition of claim 1 comprising:
    (A) from greater than or equal to 2 wt % to 19 wt % of a blend of the maleic anhydride-grafted ethylene-based polymer and the maleic anhydride-grafted styrene/ethylene/butylene/styrene (SEBS) block copolymer;
    (B) from greater than or equal to 0.1 wt % to 5 wt % of the epoxy-functionalized silane;
    (C) from 80 wt % to 99 wt % of an organic solvent that is a mixture of methylcyclohexane and cyclohexanone; and
    (D) from greater than 0.1 wt % to less than 5 wt % of the polyisocyanate crosslinking agent.

11. The composition of claim 1 comprising:
    (A) from greater than or equal to 2 wt % to 19 wt % of the maleic anhydride- grafted ethylene-based polymer;
    (B) from greater than or equal to 0.1 wt % to 5 wt % of the amine-functionalized silane; and
    (C) from 80 wt % to 99 wt % of an organic solvent that is a mixture of methylcyclohexane and cyclohexanone.

12. The composition of claim 1 comprising
    (A) from greater than or equal to 2 wt % to 19 wt % of the maleic anhydride-grafted ethylene-based polymer;
    (B) from greater than or equal to 0.1 wt % to 5 wt % of the amine-functionalized silane;
    (C) from 80 wt % to 99 wt % of an organic solvent that is a mixture of methylcyclohexane and cyclohexanone; and
    (D) from greater than 0.1 wt % to less than 5 wt % of the polyisocyanate crosslinking agent.

13. The composition of claim 1 comprising
    (A) from greater than or equal to 2 wt % to 19 wt % of a blend of the maleic anhydride-grafted ethylene-based polymer and the maleic anhydride-grafted styrene/ethylene/butylene/styrene (SEBS) block copolymer;
    (B) from greater than or equal to 0.1 wt % to 5 wt % of the amine-functionalized silane;
    (C) from 80 wt % to 99 wt % of an organic solvent that is a mixture of methylcyclohexane and cyclohexanone; and
    (D) from greater than 0.1 wt % to less than 5 wt % of the polyisocyanate crosslinking agent.

14. A multilayer structure comprising:
    (a) A fabric layer comprising glass fibers;
    (b) A membrane layer comprising a nonpolar olefin polymer; and
    (c) An adhesive layer between and in contact with both the fabric layer and the membrane layer, the tie layer comprising
        (i) from greater than or equal to 2 wt % to 19 wt % of at least one of a maleic anhydride-grafted ethylene-based polymer and a maleic anhydride-grafted styrene/ethylene/butylene/styrene (SEBS) block copolymer;
(ii) from greater than or equal to 0.1 wt % to 5 wt % of a silane selected from the group consisting of an epoxy-functionalized silane, an amine-functionalized silane, and combinations thereof; and
(iii) zero to 10 wt % of a polyisocyanate crosslinking agent based on total weight of the tie layer.

15. The multilayer structure of claim 14 in which the membrane layer comprises a nonpolar propylene-based elastomer and a nonpolar ethylene-based elastomer.

16. The multilayer structure of claim 14 in the form of a waterproof roofing membrane or a textile architectural membrane.

17. The multilayer structure of claim 14 wherein the adhesive layer comprises from greater than or equal to 0.1 wt % to less than or equal to 10 wt % polyisocyanate crosslinking agent selected from the group consisting of (i) a solution of tris(p-isocyanatophenyl) thiophosphate in ethyl acetate, (ii) a hexamethylene diisocyanate (HDI) based isocyanate, (iii) an isophorone diisocyanate (IPDI), and (iv) a methylene diphenyldiisocyanate (MDI) or toluene diisocyanate (TDI) based isocyanate.

* * * * *